H. BATES.
TIME CONTROLLED APPARATUS.
APPLICATION FILED DEC. 3, 1910.

1,007,415.

Patented Oct. 31, 1911.
6 SHEETS—SHEET 1.

WITNESSES:
L. H. Schmidt
H. E. Stonebraker

INVENTOR
HARRY BATES,
ATTORNEY

H. BATES.
TIME CONTROLLED APPARATUS.
APPLICATION FILED DEC. 3, 1910.
1,007,415.
Patented Oct. 31, 1911.
6 SHEETS—SHEET 5.
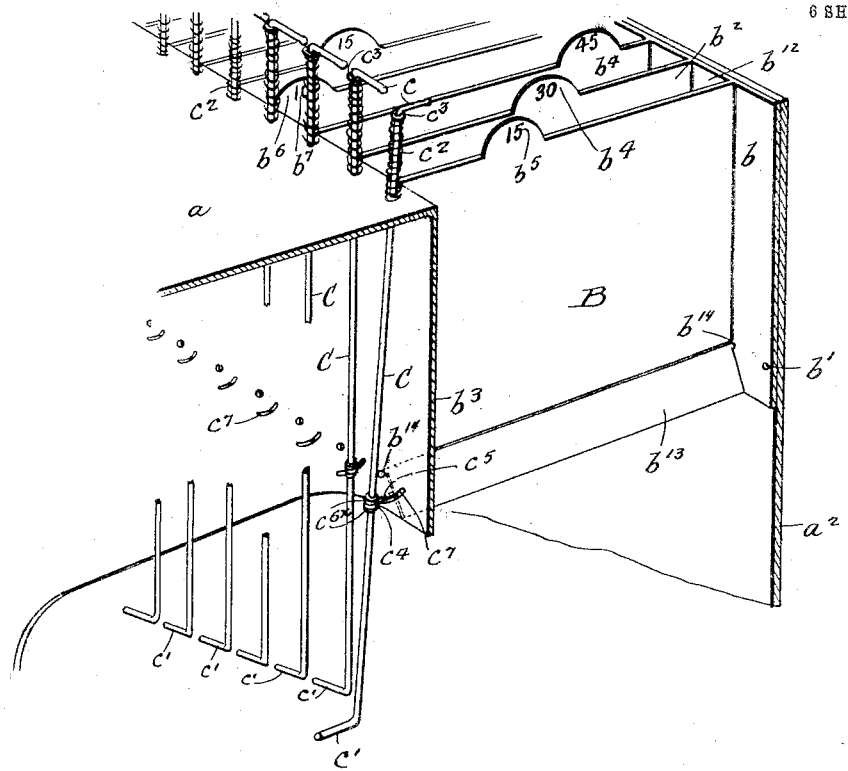
Fig. 5.
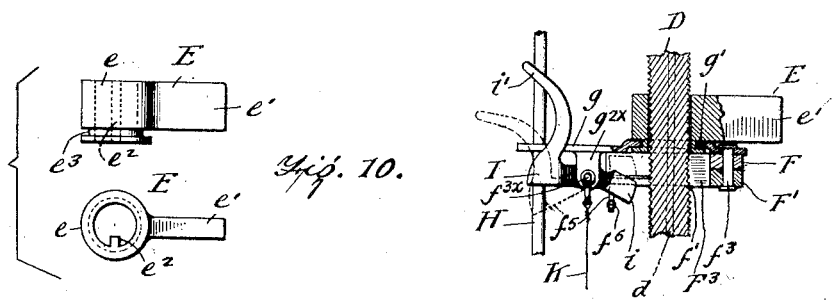
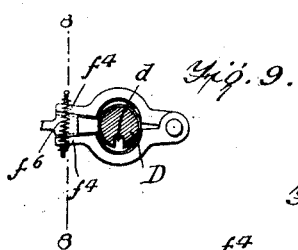
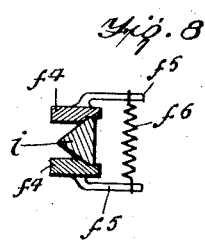
WITNESSES:
L. H. Schmidt
H. E. Stonebraker
INVENTOR
HARRY BATES,
BY
E. T. Brandenburg
ATTORNEY

H. BATES.
TIME CONTROLLED APPARATUS.
APPLICATION FILED DEC. 3, 1910.

1,007,415.

Patented Oct. 31, 1911.
6 SHEETS—SHEET 6.

WITNESSES:
L. H. Schmidt
H. E. Stonebraker

INVENTOR
HARRY BATES,
BY
ATTORNEY

UNITED STATES PATENT OFFICE.

HARRY BATES, OF WEST COPAKE, NEW YORK.

TIME-CONTROLLED APPARATUS.

1,007,415.

Specification of Letters Patent. Patented Oct. 31, 1911.

Application filed December 3, 1910. Serial No. 595,493.

*To all whom it may concern:*

Be it known that I, HARRY BATES, a citizen of the United States, residing at West Copake, in the county of Columbia and State of New York, have invented new and useful Improvements in Time-Controlled Apparatus, of which the following is a specification.

*Prefatory.*—My invention relates to the broad class of inventions known by the generic name of "time-controlled mechanisms," and has more particular reference to a device affording mechanical means for remembering, aiding the human memory and positively preventing forgetfulness. It could be aptly characterized as a "time-index," a "memory box" or a "remembrancer."

*Objects.*—The invention has for its object, generally stated, to provide a novel type of mechanism, of the nature referred to, which shall be relatively simple in construction and, consequently, susceptible of manufacture at a reasonable cost, which shall be absolutely automatic, positive, and reliable in operation, and which may be sold at a comparatively moderate cost, to net a good profit to the manufacturer.

A specific object is the provision of such a device which shall be very compact in its nature, so that it may be admirably adapted for use as an office-convenience, in that it is designed to be of such size as to be readily disposed on an office desk.

Other subsidiary objects, going to make up the ultimate perfection of the whole device, will appear as the specification proceeds and the nature of the invention more fully appears.

*Uses.*—The devices of my invention are capable of advantageous use in a multiplicity of situations: They are most admirably adapted for use in offices of business men and of professional men, and in shops and factories, as they can be utilized to remind the user thereof of bills to collect, notes that are due, of times for consultations and engagements, of telephone-calls to be attended to, etc. If the user of the device be a lawyer, it can be employed to remind him of his cases in court, of engagements with clients, etc. If the user be a hotelkeeper, it will be unnecessary for him to keep the usual room-call lists of his guests, for my device automatically delivers the cards, at predetermined intervals, to the telephone-operator, or bell-boy, or other employee, avoiding all mistakes. If the user be a newspaper editor, it can be employed as a reminder of the proper times to give out assignments, etc. If the user be a car-despatcher, it can be employed to remind him of the times when certain cars shall leave the barn, etc. If the user be a public speaker, it can be employed to deliver, automatically, at predetermined intervals, as desired, the sub-heads or different paragraphs of the speech or discourse. The device may be used, to advantage, by public officers, physicians, nurses, dentists, train-despatchers, etc. It is impossible and would be superfluous to enumerate all the uses to which the invention may be applied; the above are given simply as a skeleton outline, it being axiomatic that an inventor is entitled to protection for his invention in all the uses to which it may be put.

*Brief outline of general structure.*—With the above objects and uses in view, it may be noted that the invention contemplates the utilization, in a novel and advantageous manner, of index-cards or units, *i. e.*, of cards, as units, bearing indicia or legends, constituting memoranda, or means of identification, such cards being familiar in the various well-known card-index systems in common use in this country and abroad.

The invention is designed, primarily, to provide a card-index discharging-apparatus and alarm-device, which shall be mechanically controlled automatically to discharge a card, or set or sets of cards, at desired, predetermined intervals, and, synchronously therewith, if desired, to sound an audible alarm.

More specifically, the invention contemplates the provision of a box or casing having therein two distinct sets or series of card-holders, pockets, or sections, one set thereof constituting a daily card-index, and the other set thereof a monthly card-index; and the pockets of each set having dumping-bottoms or gates engageable by lever-rods, which are adapted to be automatically actuated by tripping-mechanism; and, in this connection, it may be said that the daily card-index sections are designed to be automatically tripped only when they contain cards, as distinguished from the monthly card-index sections, which are automatically tripped at midnight each day, irrespective of whether or not there happens to be any card or cards therein.

The invention also contemplates the novel construction whereby the card-index pockets may be manually tripped, when desired, to release their contents.

*Brief description of the drawings.*—In the accompanying drawings, forming part of my application for patent, and in which like letters of reference indicate corresponding parts throughout the several views, I have, for illustrative purposes, shown one form of embodiment of my invention, capable of carrying out the underlying principles thereof; and in these drawings:

Figure 1 is a front elevation of my device; Fig. 2 is a longitudinal, vertical section, taken on the line 2—2, Fig. 1; Fig. 3 is a bottom plan view; Fig. 4 is a transverse, vertical section, on the line 4—4, Fig. 2; Fig. 5 is a fragmentary, enlarged, perspective, detail view of a portion of the casing and of certain card-pockets and the lever-rods actuating the dumping-bottoms or gates of said pockets; Fig. 6 is a fragmentary, detail view, in top plan, partly in section, showing, essentially, a portion of one of the worm-rods, one of the card-pocket lever-rod trippers and its associated mechanism traveling on the worm-rod, and the means for releasing such associated mechanism from engagement with the worm-rod, to permit said tripper and its connected mechanism to return to initial position; Fig. 7 is a side elevation of the parts shown in Fig. 6; Fig. 8 is a section on the line 8—8, Fig. 9; Fig. 9 is a fragmentary, detail view, in side elevation, partly in section, of a split collar (shown in Figs. 6 and 7) engaging the worm-rod; Fig. 10 is a collective detail view of one of the card-pocket lever-rod trippers. Fig. 11 is a side view of the train of gears, the main operating spring, and associated mechanism for actuating the worm-rods, part of the casing being broken away to show the interior mechanism; and Fig. 12 is a face view of the same parts, part of the casing being broken away to show interior mechanism.

*Detailed Description of the Drawings.*

Figure 1:
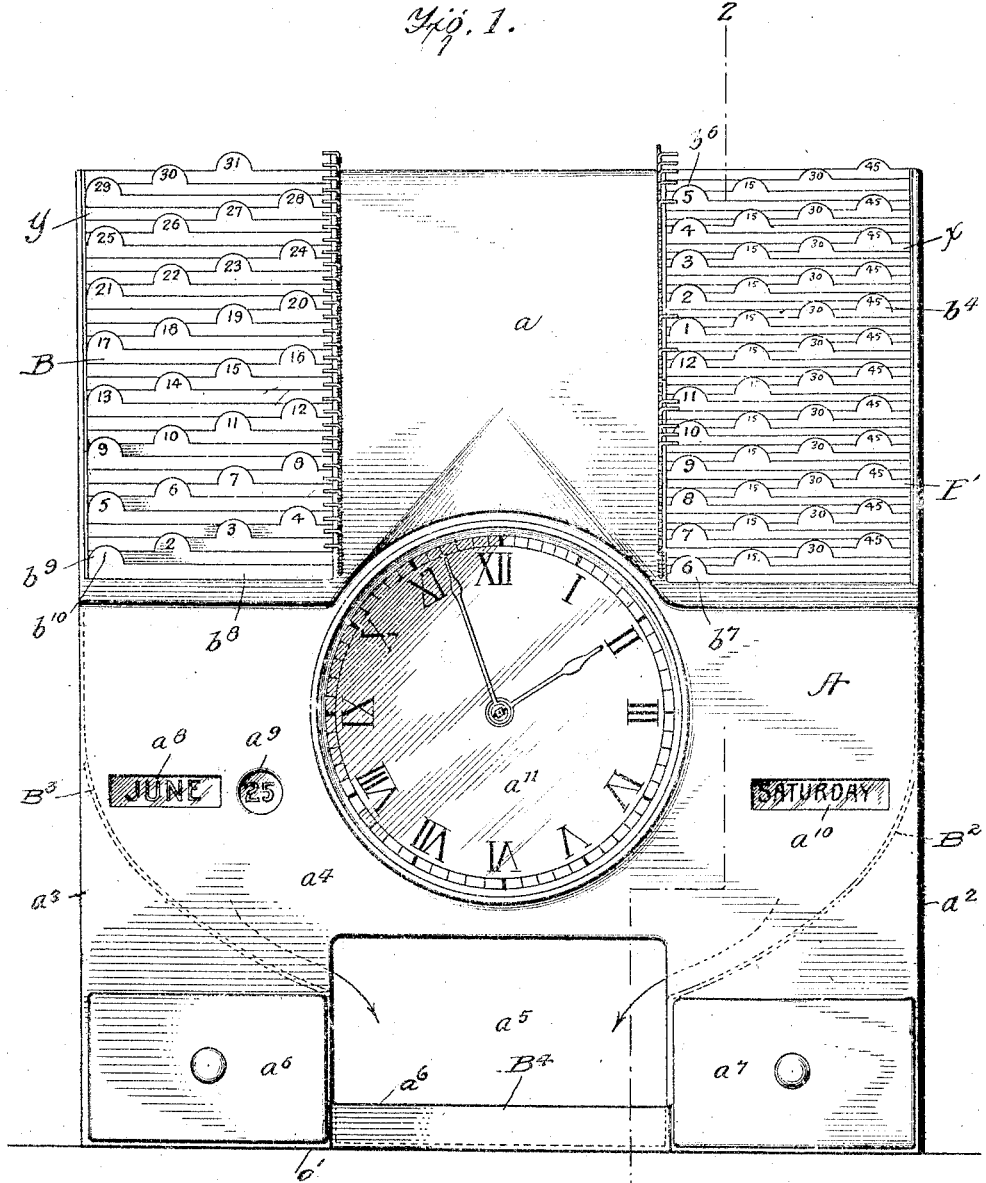
Figure 2:
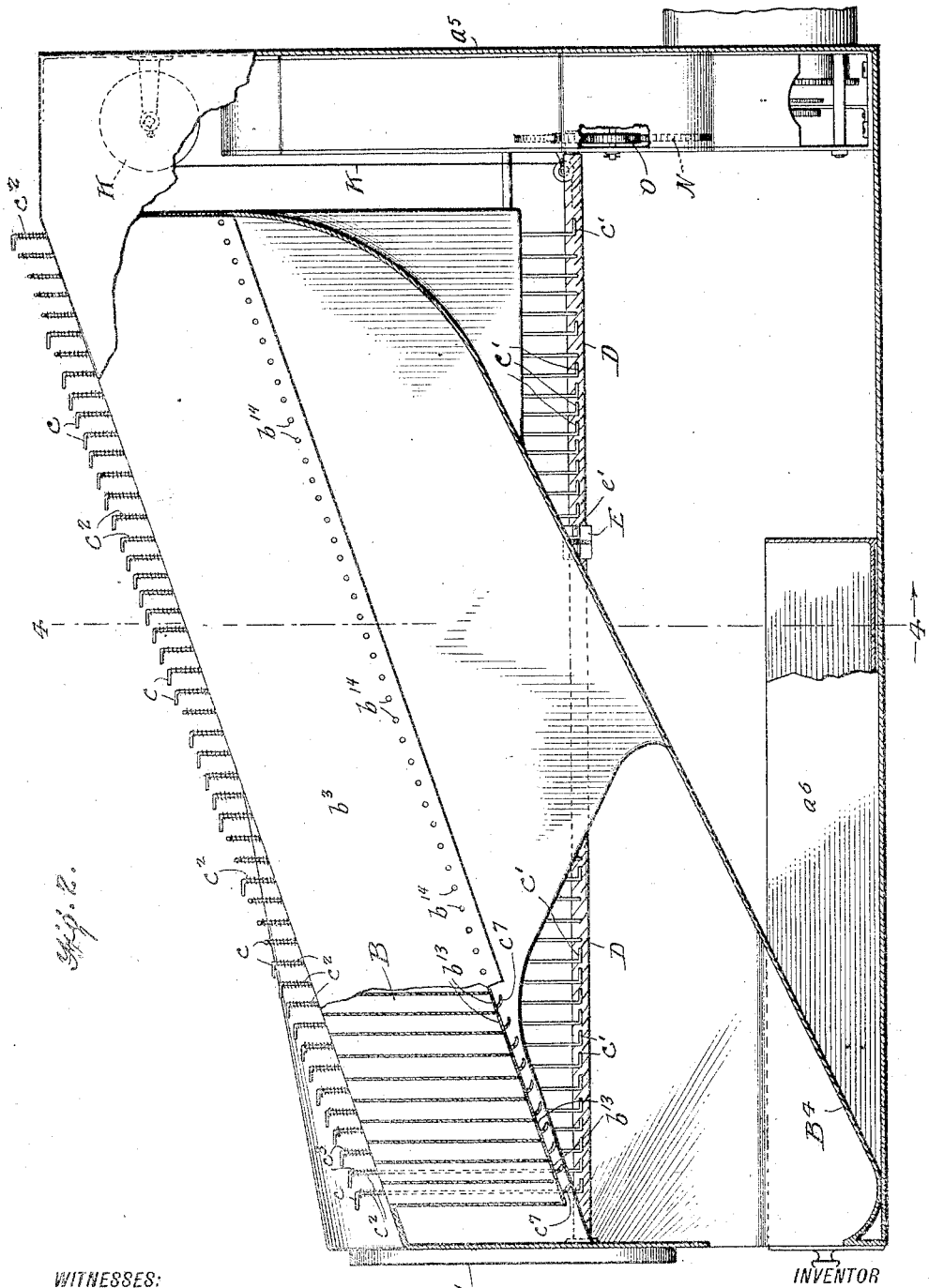
Figure 3:
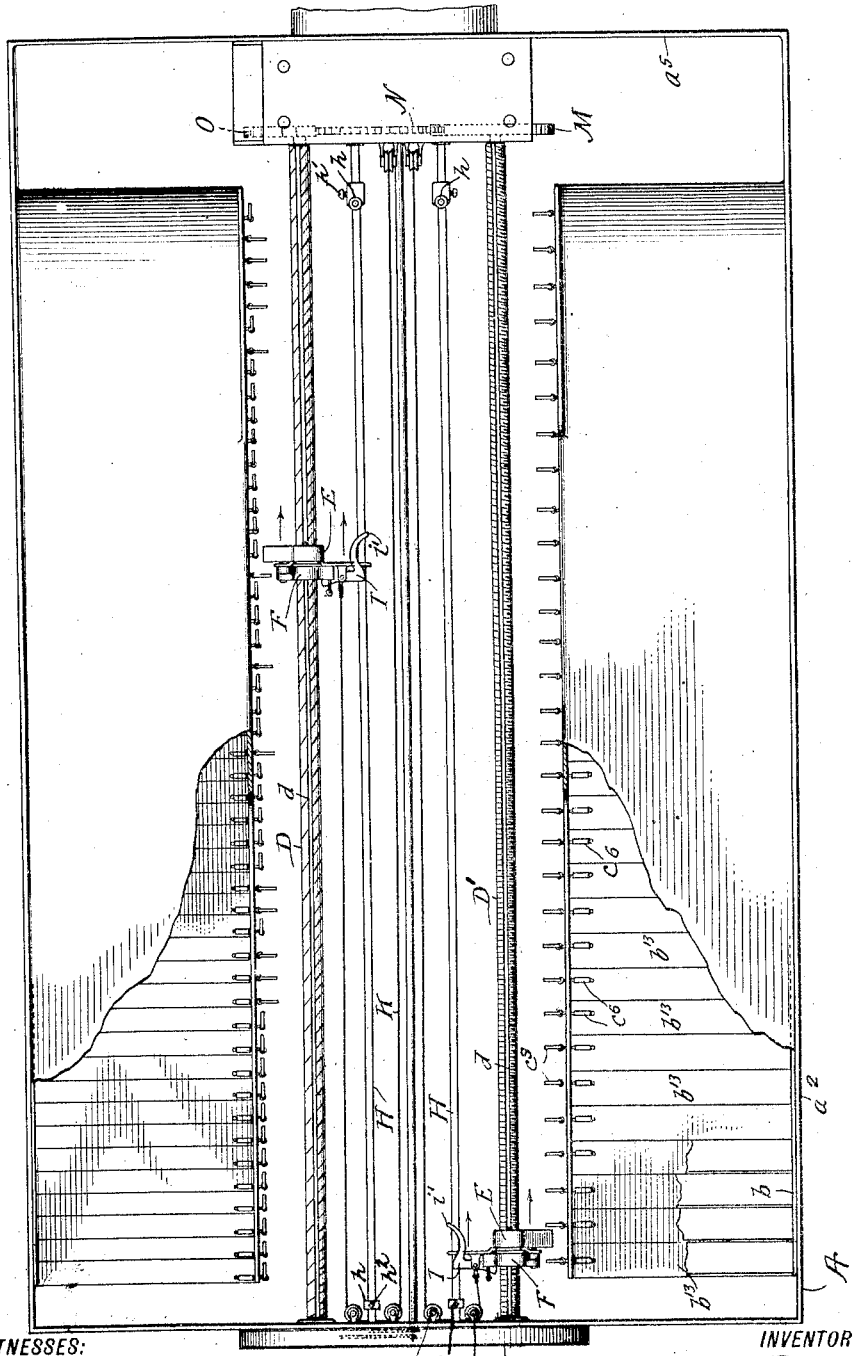

*The casing.*—Referring, now, in detail to the drawings: A designates a casing, inclosing the working parts of my mechanism, which may be of any suitable material, preferably, for strength, of light-weight metal, or even of wood, for ornamental purposes highly polished or lacquered.

The casing A may be, in shape, roughly speaking, a rectangular structure, as shown in the drawings, comprising a top $a$, a bottom $a'$, a right-hand side wall $a^2$, a left-hand side wall $a^3$, a front end wall $a^4$, and a rear end wall $a^5$. The front end wall $a^4$ is provided with a suitable opening $a^5$ for the discharge of cards released from the card-pockets (hereinafter described). Said opening is, preferably, disposed near the bottom of said wall and, advantageously, medially of the length thereof, as shown; and the bottom wall $a^6$ of said opening is, preferably, slightly above the bottom $a'$ of the casing, thus constituting an abutment or stop, against which the cards impinge and are halted in their downward flight, after release from the card-pockets. The front wall $a^4$ may, also, be provided, desirably on each side of said opening $a^5$, with additional, smaller openings for the reception of trays or drawers $a^6$, $a^7$, which may be used for any suitable purpose: For instance, if the device should be used by a physician or a dentist, the drawer $a^6$, or the drawer $a^7$, may be used as a "charge box"; that is to say, when a card, notifying him of an appointment with a patient, has been discharged from a card-pocket, he may make a memorandum thereon of a charge for his services in the particular case, after he has prescribed for, or otherwise attended to, his patient; the physician then placing the card in the "charge box"; this suggested use of the "charge box" practically subserving the function, and dispensing with the use, of a set of books. Said front face or wall $a^4$ of the casing may, also, be provided with openings $a^8$, $a^9$, $a^{10}$, for the exhibition therethrough of a calendar. Thus, through the opening $a^8$ may be seen the name of a month of the year, such as "June"; through the opening $a^9$, a number, such as "25", indicating the day of the month; and, through the opening $a^{10}$, the name of the day, such as "Saturday". The calendar placed back of the front wall $a^4$, and viewed through said openings, may, if desired, be controlled or governed in its movement by automatically-operating time-controlled mechanism; but, as this feature forms no part of my invention, I have not herein illustrated, or particularly described, such automatically-actuating calendar-mechanism, especially as such mechanisms are well-known in the arts. Said front wall $a^4$ may, also, be provided with an opening, which may be occupied by a clock-face or dial $a^{11}$.

The top $a$ of the casing is, desirably and advantageously, inclined upward from the front to the rear thereof, as shown, whereby the successive tiers of card-pockets (hereinafter specifically described) may occupy positions of differing, i. e., progressively or successively higher, points of elevation, like the rows of seats in a theater, or other public auditorium. The top $a$ is provided, preferably adjacent the two longitudinal sides thereof, with two elongated openings, X, Y, in which are seated two sets or series of

Figure 4:
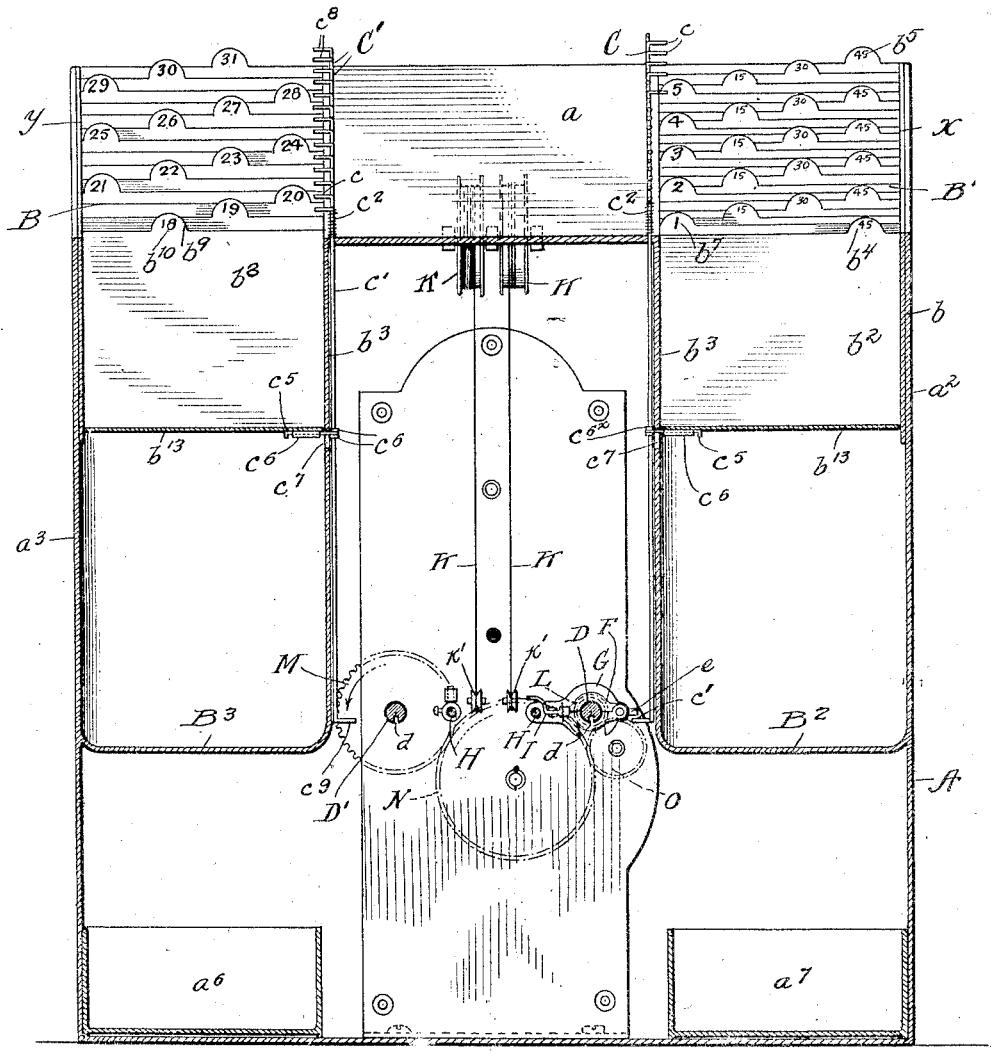
Figure 16:
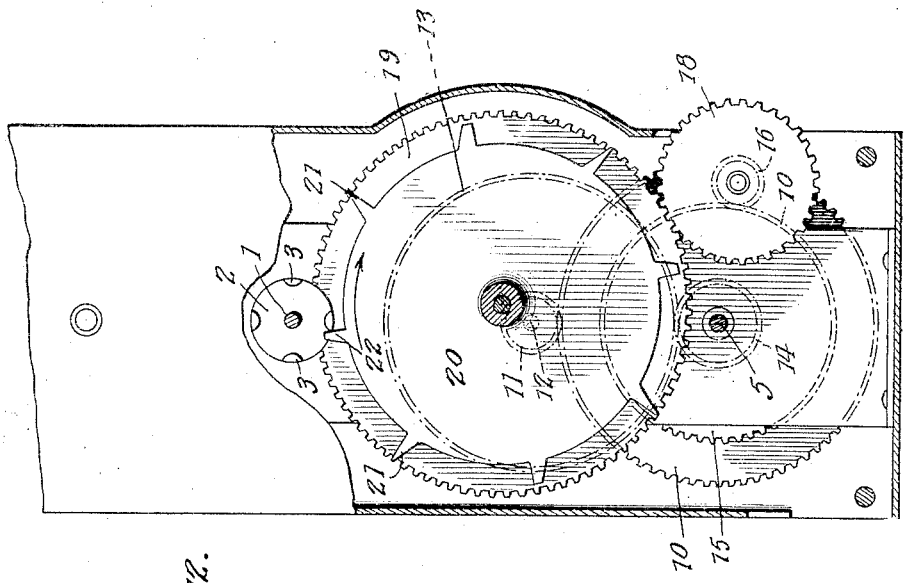
Figure 17:
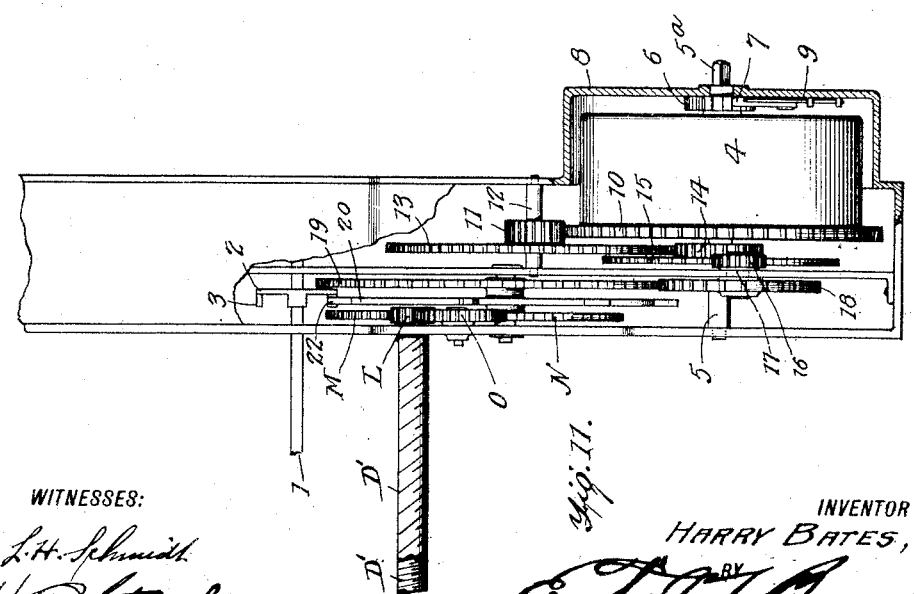

*Card-pockets or compartments.*—The sets are designated by the reference-letters B, B', the former series constituting what I term, and which will hereinafter be referred to as, the "monthly memoranda holder," the several pockets or compartments of which are tripped, successively, at midnight each day; and the latter series constituting what I term, and which will hereinafter be referred to as, the "daily memoranda holder," only such pockets of which as contain cards being tripped, successively, at predetermined intervals, as, say, each fifteen minutes during a certain number of hours, say twelve hours. The pockets or compartments, making up the sets of holders, may, obviously, be constructed in different ways, and, for example, I have illustrated in the drawing and now proceed to describe one desirable way: In the illustrated type (see more particularly Figs. 4 and 5), $b$ represents a plate, in this instance oblong or rectangular in shape, adapted to be seated against the inner surface of the side wall $a^2$ (or $a^3$), and to be suitably (preferably removably) secured thereto in any suitable manner, as by screws, or the like (not shown) screwed through one or more screw-openings $b'$ extending through said plate $b$ and registering with similar screw-openings in the walls $a^2, a^3$. This wall $b$, in the form illustrated, carries, at intervals, either integral therewith, or suitably secured thereto, vertical partitions $b^2$, extending across one of said elongated openings X, or Y, in the top $a$, and resting, at their otherwise free ends, against the vertical wall $b^3$ of said elongated opening, and carrying, at their tops, appropriate tabs or ears $b^4$ bearing printed numbers $b^5$, which, in the case of the pockets in the "daily memoranda holder" B', constitute indicia of divisions, in certain number of minutes (in this instance, fifteen) of each hour, during a certain number of hours, in this instance twelve hours of the day; and each fourth partition $b^2$ in the set carrying, at the top, at one end thereof, a tab or ear $b^6$, bearing a number $b^7$, which, in the case of the pockets in the "daily memoranda holder" B', constitute indicia of different hours of a day, as the first hour, the second hour, and so on. In this connection, it may be said that each partition $b^8$ of the "monthly memoranda holder" B carries, at the top, a tab or ear $b^9$, bearing thereon a printed number $b^{10}$, which constitutes indicia of the days of a month, as the first day, the second day, and so on. The partitions $b^2$ of the "daily memoranda holder" B', to carry out my ideas, are, for an obvious purpose, necessarily, of course, greater than those in the holder B. In all other respects, the card-pockets or compartments of the "daily memoranda holder" B' and of the "monthly memoranda holder" B are identical, and a description of one will serve for both. Each two adjacent partitions $b^2$ form therebetween, a space $b^{12}$ for cards, thus constituting a card-pocket, which pocket is open at the top and normally closed at the bottom by a swinging gate or floor $b^{13}$, formed as a plate, hinged, at opposite ends, to the plate $b$ and to the wall $b^3$, as at $b^{14}, b^{14}$.

*The tripping mechanism.*—The mechanism for tripping the card-pockets, to discharge their contents, will now be described: Operatively associated with each swinging-gate $b^{13}$ is suitable mechanism adapted to be engaged by a tripper, to swing the gates $b^{13}$ and, consequently, to dump the contents of the pockets or compartments. Said mechanism may take various forms; but I have found the one illustrated very desirable and efficacious for the purpose; and, in this case, said mechanism comprises a series of vertically-reciprocatory and rotatable lever-rods C, one thereof being provided for each pocket or compartment $b^{12}$. Said rods project, toward their top, through the top $a$ of the casing; and, preferably, their upper extremities are bent at an angle to the main body of the rod, as at $c$, forming, as it were, an arm, or a handle, and, also, their lower extremities are desirably bent, as at $c'$, but, advantageously, in a diametrically opposite direction to the arms $c$, these bent portions $c'$ constituting feet to be engaged by a tripper (presently to be described); and the fingers $c'$ and the arms $c$ pointing in diametrically opposite directions. Encircling the upper portion of each rod C is a coiled spring $c^2$, its lower end bearing upon the upper surface of the top $a$ of the casing, and its upper end against a collar $c^3$ carried by the rod C near the point where the handle or arm $c$ joins the body of the rod, this spring subserving the obvious function of automatically returning the lever-rod C and, consequently, the swinging gates $b^{13}$ to initial or normal position, after said rod has been depressed and said gate swung open. Each rod C passes through the eye $c^4$ of a pin $c^5$ loosely mounted in bearings $c^6$ secured to the under surface of the swinging gate $b^{13}$. The pins $c^5$ may be held on the rods C, against vertical reciprocatory movement thereon, by any suitable means; in this instance, by collars $c^{6x}, c^{6x}$ fast on the rods C and disposed one directly above and the other directly beneath said eye $c^4$. Said pins $c^5$ work in arcuate slots $c^7$ in the walls $b^3$.

It will now be seen that, in order manually to dump the contents of a particular card-pocket or receptacle $b^{12}$, all that has to be done is to depress the corresponding rod C by pressing with the finger upon its handle or arm $c$, which will rock or swing the gate $b^{13}$ on its pivots $b^{14}$, $b^{14}$, thus opening the gate to dump the cards. As soon as the finger shall have been released from the handle $c$, the coiled spring $c^2$ immediately automatically returns the rod C to initial position and, consequently, the gate $b^{13}$ to closed position. Beneath the movable gates $b^{13}$ of each set of holders B and B' is a card-discharge slide $B^2$, $B^3$, which converge toward their forward ends and merge into a common chute $B^4$, leading to the opening $a^5$.

Mechanism is provided for automatically dumping the contents of the pockets $b^{12}$, which will soon be described; but it is to be noted that, in the case of the "daily memoranda holder" B', I prefer that only those pockets shall be dumped which contain cards, and, consequently, in the case of the "daily memoranda holder" B', when the handle or arm $c$ of any rod C is turned to point in the direction of the wall $a^2$ of the casing (for instance, one handle is so shown in Fig. 5), the foot $c'$ of said rod is turned into the path of movement of the tripper (about to be described), so as to be engaged and moved thereby. Therefore, when an operator places a card in any pocket of the "daily memoranda holder" B', he turns the handle or arm $c$ of the particular rod C controlling the gate of such pocket, so that it points in the direction of the wall $a^2$. When the handles or arms $c$ point in the direction of the front wall $a^4$ of the casing (for instance, three of the rods are so shown in Fig. 5), the feet $c'$ of said rods are out of the line or path of movement of the tripper, and cannot be engaged thereby. In the case of the "monthly memoranda holder" B, my idea is to have the gates of these card-pockets swung open at midnight each day, irrespective of whether or not there be any cards in the compartments or pockets; and, with this idea in view, all of the rods C' appertaining to the "monthly memoranda holder" B may be turned with their arms $c^8$ pointing in the direction of the wall $a^3$, whereby the feet $c^9$ of all said rods are in the path of movement of the tripper. But, of course, if desired, any one or more of the rods C', may be turned (similarly to the rods C) so that their feet $c^9$ shall be out of the path of movement of the tripper. It is to be understood, of course, that the two sets of rods C and C' (one set C for the "daily memoranda holder" B' and the other set C' for the "monthly memoranda holder" B) are constructed identically the same.

Mounted in suitable bearings in the front and rear walls $a^4$, $a^5$, respectively, of the casing A are two, horizontally-disposed, rotatable worm-rods D, D', carrying the tripper-mechanism (presently to be described), the rod D being arranged in proximity to the feet $c'$ of the rods C, and the rod D' being arranged in proximity to the feet $c^9$ of the series of rods C'; and the rod D' being more coarsely threaded than the rod D, whereby, for the same movement given both rods, the tripping-mechanism on the rod D will travel farther than that on the rod D'. Each of the rods D, D' is provided with a longitudinal groove, or key-way, $d$, extending the entire length of the rods.

Separate tripping mechanism is carried by each worm rod D, D'; but, as it is the same on both rods, a description of the mechanism carried by one rod will serve for both. Said tripping-mechanism will now be described in connection with one rod, as D: Slidably and loosely mounted on the worm-rod D is a tripping-member E, which may be variously formed, but, in this case, comprises a hub $e$, having a smooth, unthreaded bore, through which the worm-rod D extends, and having, also, at one end thereof, an exterior, circumferential, annular groove $e^3$; a key or spline $e^2$, interiorly of the hub, riding in the key-way or groove $d$ in the worm-rod D, whereby, as the worm-rod D is rotated, the tripper E is, likewise, rotated; a finger $e'$ projecting or extending from said hub $e$, and adapted, in the operation of the mechanism, to be brought into position to bear upon the foot $c'$ (or $c^9$) of a rod C (or C'), whenever such foot lies in the path of movement thereof.

Engaging the worm-rod D is a split collar $F^3$ interiorly threaded, as at $f'$, and formed in two similar sections, an upper section F and a lower section F', each section having, at one end, an extension or flange $f^2$, which extensions are hinged together at their ends, as by the hinge-pin $f^3$; each of the sections, F, F', at its opposite end, having an extension $f^4$, forming a jaw. Each jaw $f^4$ carries a pin $f^5$ and connecting said pins is a spiral spring $f^6$, which subserves the function of automatically returning the jaws to closed position, after they have been opened by a lever-and-wedge mechanism (presently to be described).

The invention contemplates the provision of means for automatically and quickly returning the tripper E to initial position, after having completed its full travel, and, while this mechanism may take various forms, I have found that illustrated in the drawings and now to be described very efficacious and desirable for the purpose: Coupling the tripper E to said split collar (formed of the sections F, F') is a member G, comprising an arm $g$, one end of which is loosely mounted on a horizontal rod H mounted in suitable bearings in the casing A and disposed parallel to the worm-rod D, the rod H thus preventing any rotary movement of the member G. The member G also comprises the yoke $g'$, engaging and riding in the groove $e^3$ of the tripper E. The yoke terminates in an ear $g^2$, through which passes said pivot or hinge-pin $f^3$.

Carried by the arm $g$ are two ears $g^{2x}$, $g^{2x}$, between which is fulcrumed on pin $f^{3x}$ a lever I, having, at one end, a wedge-shaped head $i$, adapted to be forced between and, thus, to open the jaws $f^4$, $f^4$, and, at the other end, an arm $i'$ arranged in the path of movement of a stop or abutment $h$, adjustably carried by the rod H toward one end thereof. The adjusting-feature may be provided by a set-screw $h'$ passing through said stop and clamping it to the rod, or may be secured in any other desired manner. Said rod H carries, toward the other end thereof, another similar stop $h^2$, also arranged in the path of travel of said lever-arm $i'$. Secured to the ears $g^{2x}$, $g^{2x}$ is a cord $k$, or the like, which passes over suitable guides, such as pulleys $k'$, and is wound upon a spring-roller K supported toward the rear of the casing A.

The operation of the mechanism just described is, it is thought, obvious, but, briefly described, is as follows: When the tripper E completes its full travel along the worm-rod D, the lever-arm $i'$ strikes against the stop $h$, which moves the lever I upon its fulcrum and forces the wedge $i$ (carried by said lever) between the jaws $f^4$, $f^4$ of the internally-threaded, split collar $F^3$, thus swinging open said jaws and the two sections F, F′ of the split-collar $F^3$ on their hinge $f^3$, and, of course, as soon as the sections F, F′ are opened, their internally screw-threaded faces are released from engagement with the threads of the worm-rod D. The spring-roller K thereupon operates to wind up thereon the cord $k$, thereby pulling said split-collar $F^3$ and its connected tripper E back to initial position. As said collar $F^3$ and tripper E reach initial position, the lever-arm $i'$ strikes against the abutment or stop $h^2$, which gives a reverse movement to said lever-arm $i'$, lever I, and wedge $i$, and rocking said wedge out of said jaws $f^4$, $f^4$, whereupon the spring $f^6$, attached to said jaws, operates to close them. It is to be understood, of course, that the worm-rod D′ carries identically the same tripping-mechanism and mechanism for releasing said tripping-mechanism to return the same to initial position as has been described in connection with the worm-rod D, and that a rod H′, similar to rod H, is also necessarily provided, adjacent the worm-rod D′.

*The worm-rod operating mechanism.*— The worm-rods D and D′ are operated by clock-work, through interposed mechanism, consisting, essentially, of a large main spring and a train of gears, which will now be described: Any well-known and common clock-mechanism may be used with my device. I may and preferably do use the well-known Seth Thomas #10 clock-movement; but, as it forms no part of my invention and is well-known, all of the clock-mechanism has been omitted from the drawings, except one of the time-shafts 1. Said time-shaft 1 carries, concentrically disposed thereon, an annular disk 2, carrying, circumferentially, a suitable number of equi-distant pins 3, according to which time-shaft said disk is on; in this instance, four pins are shown.

4 designates a main-spring wheel or barrel fast on a shaft 5, provided, at one end, with a winding-stem $5^a$. Said shaft carries, fast thereon, a ratchet-wheel 6 engaged by a spring-pressed pawl or dog 7 pivoted to the casing 8, the pawl-spring being designated by 9. The ratchet-wheel 6, of course, is used in winding up the spring in the barrel 4, the power being retained by means of the dog or pawl and spring 9. Any suitable train of gears may be used. As one example, I show and describe the following: The spring-barrel 4 carries, circumferentially, a gear 10, meshing with a small pinion 11 on a shaft 12. Carried by the shaft 12 and revolving in unison with the pinion 11 is a large gear 13, meshing, in turn, with a smaller gear 14. Gear 14 revolves in unison with a larger gear 15, which meshes with a small pinion 16 fast on a revoluble shaft 17. Also fast on said shaft 17 is a gear 18, meshing with another larger gear 19. Revolving in unison with the gear 19 is a concentrically-disposed wheel 20, carrying, circumferentially, a plurality of teeth of varying length. Each alternate tooth 21 is longer than the next adjacent tooth 22. The distance between any one of said short teeth and the next preceding longer tooth is less than the distance between said short tooth and the next succeeding longer tooth, as shown clearly in Fig. 12. Revolving in unison with said gear 19 and with said wheel 20, and mounted concentrically therewith, is a large gear-wheel N, which meshes with a gear M fast on the end of the worm-rod D′. Gear N also meshes with a gear O (which is much smaller than the gear M), the latter meshing with a still smaller gear L fast on the end of worm-shaft D. As before premised, I prefer to have the card-compartments of the "daily memoranda holder" dumped, successively, at fifteen-minute intervals during twelve-hours, and the card-compartments in the "monthly memoranda holder" dumped, successively, at mid-night each night. Therefore, the tripping-mechanism carried by the worm-shaft D′ must move along said rod at greatly less speed than the tripper carried by the worm-shaft D. While this difference in movement could be accomplished by simply adjusting the pitch on the threads of the worm-shafts so that the pitch on the threads on the worm-shaft D′ shall be much less than that on the worm-shaft D; yet I prefer as an advantageous arrangement and construction not only to have a greater pitch of the threads on the worm-shaft D, but, also, to provide that the worm-shaft D will be revolved much faster than the worm-shaft D', and this is accomplished by having the gear O much smaller than the gear N, and the gear L still smaller than the gear O (i. e., to provide an intermediate gear O), and to have the large gear M carried by worm-shaft D' directly operated by the gear N, and to have the gear M much larger than the gears O, L.

The operation of the mechanism is apparent from the foregoing description of the construction and arrangement of the different coöperating parts: The time-shaft 1 revolves, and each fifteen minutes two of the teeth on the wheel 20 (a longer tooth 21 and a shorter tooth 22) escape past one of the pins 2 on disk 2 carried by said time-shaft. The short tooth passes first, opening the gate of one of the card-compartments, and, a moment later, said longer tooth escapes past said pin, allowing the gate of said card-compartment to close.

Having thus fully described my invention, what I claim as new and desire to secure by Letters-Patent is:

1. A casing, several series of receptacles therein adapted for the temporary retention and eventual discharge therefrom of articles, the receptacles of each series being controllable to discharge their contents independently of the time of discharge of the contents of the receptacles of the other series, and automatically operating time-controlled mechanism common to both series governing and effecting said independent discharge, as aforesaid.

2. A casing, several series of receptacles therein, the receptacles of each series being controllable to discharge their contents independently of the time of discharge of the contents of the receptacles of the other series, and automatically-operating mechanism common to both series governing and effecting said independent discharge, as aforesaid, and including a main spring and time-controlled means for releasing said spring at intervals.

3. A casing, several series of receptacles therein, the receptacles of each series being controllable to discharge their contents independently of the time of discharge of the contents of the receptacles of the other series, and automatically-operating mechanism common to both series governing and effecting said independent discharge, as aforesaid, and including a main spring, a train of gears, and time-controlled means for releasing said spring at intervals.

4. A casing, several separate and distinct series of receptacles therein adaptable for the temporary retention therein and eventual discharge therefrom of articles such as memoranda-cards, and automatically-operating mechanism for automatically discharging the contents of said receptacles, said mechanism including: worm-shafts, each worm-shaft being operatively-associated with a different series of said receptacles; an operating main-spring; mechanism intermediate of and operatively connected to said worm-shafts and said spring; and time-controlled means for releasing said spring at intervals.

5. A casing, several separate and distinct series of receptacles therein adaptable for the temporary retention therein and eventual discharge therefrom of articles such as memoranda-cards, and automatically-operating time-controlled mechanism for automatically-discharging the contents of said receptacles, said mechanism discharging the contents of the compartments of each series at a different time, said mechanism including: worm-shafts, each worm-shaft being operatively-associated with a different series of said receptacles; an operating main-spring; a train of gears connecting said spring and said worm-shafts; and means for automatically releasing said spring at intervals.

6. A casing, several separate and distinct series of receptacles therein adaptable for the temporary retention therein and eventual discharge therefrom of articles such as memoranda-cards, and automatically-operating, time-controlled mechanism for automatically-discharging the contents of said receptacles, said mechanism discharging the contents of the compartments of each series at a different time, said mechanism including: worm-shafts of differing coarseness of thread, each worm-shaft being operatively-associated with a different series of said receptacles; an operating main-spring; mechanism intermediate of and operatively associated with said worm-shafts and said spring; and means for automatically releasing said spring at intervals.

7. A casing, several series of receptacles therein, each receptacle being provided with a movable gate, the gates of each series being operable independently of the time of operation of the gates of the other series, and automatically-operating time-controlled mechanism common to both series effecting said independent operation of the gates, as aforesaid.

8. A casing, several series of receptacles therein, each receptacle being provided with a movable gate, the gates of each series being operable independently of the time of operation of the gates of the other series, and automatically-operating mechanism common to both series effecting said independent operation of the gates, as aforesaid, said mechanism including a main spring, and time-controlled means for releasing said spring at intervals.

9. A casing, several separate and distinct series of receptacles therein, said receptacles being each provided with a movable gate, and automatically-operating mechanism for automatically-actuating said gates, successively, said mechanism including, essentially, an operating main-spring, worm-shafts, each worm-shaft being operatively-associated with the movable gates of a different series of compartments, mechanism intermediate of and operatively-associated with said worm-shafts and said spring, and time-controlled means for releasing said spring at intervals.

10. A casing, several series of receptacles therein, each receptacle being provided with a movable gate, tripable means operatively associated with each gate, the gate-tripable means of each series of receptacles being tripable independently of the time of tripping of the gate-tripable means of the other series, and means for automatically actuating said gate-tripable means of each series independently of the time of actuation of the tripable means of the other series, including a main spring, and time-controlled means common to both series for releasing said spring at intervals.

11. A casing, several separate and distinct series of receptacles therein, said receptacles being each provided with a movable gate, tripable means operatively associated with each gate, and means for automatically actuating said tripable means, successively, and including: wormshafts, each wormshaft for use in connection with a different series of compartments, tripping means movable on said worm-shafts and engageable with said tripable means, and means for actuating said worm-shafts to move said tripping-means longitudinally thereon and including an operating main-spring, and time-controlled means for releasing said spring at intervals.

12. A casing, several separate and distinct series of receptacles therein, said receptacles being each provided with a movable gate, tripable means operatively associated with each gate, and means for automatically actuating said tripable means, successively, and including: worm-shafts, each worm-shaft for use in connection with a different series of compartments, a tripper carried by and movable longitudinally on each worm-shaft, and means for actuating said worm-shafts to move said trippers alsong said shafts and including an operating main-spring, and time-controlled means for releasing said spring at intervals; and means for automatically returning said trippers to initial position after completion of their range of travel.

13. A casing, several series of receptacles therein, each receptacle being provided with a movable gate, tripable means operatively associated with each gate, the gate-tripable means of each series of receptacles being tripable independently of the time of tripping of the gate-tripable means of the other series, said gate-tripable means including a vertically-reciprocatory tripable member, and time-controlled mechanism common to both series automatically actuating said gate-tripable means of each series independently of the time of actuation of the tripable means of the other series.

14. A casing, several series of receptacles therein, each receptacle being provided with a movable gate, tripable means operatively associated with each gate, the gate-tripable means of each series of receptacles being tripable independently of the time of tripping of the gate-tripable means of the other series, said tripable means being movable out of tripable position, and time-controlled mechanism common to both series automatically actuating said gate-tripable means of each series independently of the time of actuation of the tripable means of the other series.

15. A casing, several series of receptacles therein, each receptacle being provided with a movable gate, tripable means operatively associated with each gate, the gate-tripable means of each series of receptacles being operable independently of the time of tripping of the gate-tripable means of the other series, time-controlled mechanism common to both series automatically actuating said gate-tripable means of each series independently of the actuation of the tripable means of the other series, and means for automatically returning said tripable means to normal position after actuation thereof.

16. A casing, several series of receptacles therein, each receptacle being provided with a movable gate, tripable means operatively associated with each gate, the gate-tripable means of each series of receptacles being operable independently of the time of tripping of the gate-tripable means of the other series, time-controlled mechanism common to both series automatically actuating said gate-tripable means of each series independently of the actuation of the tripable means of the other series, and spring means for automatically returning said tripable means to normal position after actuation thereof.

17. A casing, a series of receptacles therein, each provided with a movable gate, tripable means operatively associated with each gate, including a vertically disposed, tripable member, both rotatable and vertically reciprocable, and time-controlled mechanism automatically tripping said tripable member to move said gates.

18. A casing, a series of receptacles therein, each provided with a movable gate, tripable means operatively associated with each gate, including a vertically-disposed, tripable member, both rotatable and vertically reciprocable, and having, at its bottom, a foot and, at its top, a handle, and time-controlled mechanism automatically tripping said tripable member to move said gates.

In testimony whereof I have hereunto set my hand in presence of two subscribing witnesses.

HARRY BATES.

Witnesses:
 A. M. SMITH,
 ROBT. VON WALLMENICH.